Patent text

3,794,502
GLASS FOR CATHODE-RAY TUBES FOR TELEVISION DISPLAY

Coenraad Maria La Grouw, Emmasingel, Eindhoven, Netherlands, assignor to U.S. Philips Corporation, New York, N.Y.
No Drawing. Continuation of abandoned application Ser. No. 651,119, July 5, 1967. This application Feb. 17, 1971, Ser. No. 116,251
Claims priority, application Netherlands, July 9, 1966, 6609666
Int. Cl. C03c 3/04
U.S. Cl. 106—52          1 Claim

ABSTRACT OF THE DISCLOSURE

A glass especially suitable for the window of a cathode-ray tube for displaying color television images which is substantially opaque to X-radiation, non-discoloring under electron bombardment, and which can withstand high sealing temperatures. This glass contains in addition to silica, barium and calcium oxide, sodium and potassium oxides, arsenic and antimony oxides, and cerium oxide. The amounts of barium and potassium oxides are such as to insure that this glass has a suitable coefficient of expansion and temperature differences between its softening point and annealing point.

---

This application is a continuation of U.S. application Ser. No. 651,119, July 5, 1967, now abandoned.

This invention relates to glass for envelopes of cathode-ray tubes for television display, notably glass for the windows of the tubes.

Particular requirements are imposed upon a glass for envelopes of cathode-ray tubes for color television display in comparison with a glass for cathode-ray tubes for the display of black-and-white television. This is connected with the following differences in the manufacture and the use of these tubes. First the glass components of envelopes for color display cannot be sealed together directly as is possible with envelopes for black-and-white display, but must be joined using an enamel which preferably passes into the vitreous-crystalline state during sealing. This is because a tube for color display contains a so-called shadow mask which determines the paths of the required three electron beams. Further, the inner side of the screen is covered with an extremely fine raster-like pattern of three different luminescent substances which corresponds to the apertures of the shadow mask. The requirements with regard to the maximum deformation permissible for the glass are therefore much more stringent in this case than for a glass intended for a cathode-ray tube for black-and-white display. Furthermore, the temperature to which the tube must be heated during exhaustion and sealing off must be approximately twenty degrees higher and the heating process is of a longer duration than that used for tubes for cathode-ray tubes for black-and-white display.

Known glasses are technically entirely satisfactory with regard to the softening point, the quality and the thermal coefficient of expansion. However, the absorption of the X-rays produced during operating due to the electron bombardment of the glass is not high enough, so that alone for this reason it would be necessary to use an auxiliary glass pane in front of the window. This disadvantage also applies to an implosion resistant cathode-ray tube. In this latter cathode-ray tube a layer of synthetic resinous material which preferably contains glass fibers covers in an adhesive manner at least the region of the outer surface which has the strongest curvature and is adjacent the display surface, leaving the display surface itself uncovered. Due to the absence of the risk of implosion, this tube is suitable to be incorporated in a cabinet without using an auxiliary front glass pane provided the absorption of X-radiation by the glass of the window is high enough.

A principal object of the invention is to provide glass suitable for a cathode-ray tube window having a sufficiently high absorption of X-radiation.

A further object of the invention is to provide a glass for a cathode-ray tube envelope which will not discolor under electron bombardment.

A still further object of the invention is to provide a glass suitable for a cathode-ray tube for color display which can withstand high sealing temperatures.

These and further objects of the invention will appear as the specification progresses.

In accordance with the invention, it has been found that glasses within the range of compositions hereinbelow specified meet these requirements and are highly suitable for the purposes of the invention. It should be observed, too, that even minor departures from the ranges of the constituents may result in a glass which is unsatisfactory in one or more respects.

First, however, in order to obtain a relative measure of the absorption of X-radiation by glass, the absorption of X-radiation of a certain intensity by an arbitrary glass is compared to the absorption by a known reference glass. To this end, the intensity of the X-radiation is measured which passes through a plate 11 mm. in thickness made of the reference glass which is placed in front of an X-ray tube operating at a voltage of 27.5 kv. These values for the voltage and the thickness of the glass are commonly used for color television display tubes. Subsequently the voltage of the X-ray tube at which a plate made of the unknown glass provides an equal intensity of transmitted X-radiation is determined. The difference between the last-mentioned voltage and 27.5 kv. is a relative measure of the X-ray absorption of the unknown glass. It has been found that the influence of a protective auxiliary front glass pane made of glass of the usual and usual thickness (3.3 mm.) upon the X-ray absorption is equivalent to +1.5 kv. This means that for use of cathode-ray tubes for color display without a protective front glass there is need of glass having a value for $\Delta$ kv. which is at least +1.5 kv. as compared to that of the known glass.

It has also been found that discoloration of glass by the influence of the electron bombardment is determined to a considerable extent by the electrical resistance of the glass insofar as only few or no readily reducible metals, such as lead, are present in the glass. The previously-mentioned known glasses for color television display tubes exhibit a slight discoloration; they have a resistivity of approximately $10^{9.1}$ ohms cm. at 250° C. and approximately $10^{7.0}$ ohms cm. at 350° C. Experience has shown that glasses for color television display tubes must have a resistivity which is certainly not lower than the specified values.

For satisfactory preparation of the glass and molding it into windows it is necessary that the temperature dependence of the viscosity not be unduly high. In practice, this implies that the temperature difference between the softening point, i.e. the temperature at which the viscosity of the glass is $10^{7.6}$ poises, and the annealing point, i.e. the temperature at which the viscosity of the glass is $10^{13.4}$ poises, must be at least 195° C.

In connection with usual manufacturing techniques and the very stringent requirement imposed upon the maximum deformation permissible for the glass components during the manufacture of the tube it is necessary that a glass intended for a color display tube have an annealing point which is not lower than 485° C.

Finally, it is important that a glass for a color television display tube have the same coefficient of expansion as known glasses (approximately $99 \times 10^{-7}$ between 30° C. and 300° C.) so as to conform with the existing glass and metal components which have to be sealed on and into the tube.

Glasses, according to the invention, which meet the aforesaid requirements, have a composition as follows:

|  | Percent by weight |
|---|---|
| $SiO_2$ | 62–66 |
| $Li_2O$ | 0–1 |
| $Na_2O$ | 7–8.5 |
| $K_2O$ | 6.5–9 |
| CaO | 2–4.5 |
| BaO | 11–14 |
| MgO | 0–3 |
| PbO | 0–3 |
| $Al_2O_3$ | 1–4 |
| $As_2O_3 + Sb_2O_3$ | 0.3–0.7 |
| $CeO_2$ | 0.05–0.3 |

The softening point of these glasses lies between 680° C. and 700° C.; their annealing point lies between 485° C. and 500° C. and their thermal coefficient of expansion is approximately 97 to $100 \times 10^{-7}$ between 30° C. and 300° C. The above-mentioned value for Δ kv. is at least +1.5 kv. and their electrical resistance is at least $10^{9.1}$ ohm cm. at 250° C. and at least $10^{7.0}$ ohm cm. at 350° C.

The table below shows, by way of example, six glasses which lie within the composition range according to the invention. These glasses are obtained in a manner as is usual in the glass industry by melting the oxides, or compounds which are converted into these oxides during the process.

The essential physical properties are shown in the table; U.C. is the coefficient of expansion between 30° C. and 300° C.; AP is the annealing point; SfP is the softening point; StP is the main point, i.e., the point at which the viscosity is $10^{14.6}$ poises; WP is the temperature at which the viscosity is $10^{4.0}$ poises and $\rho$ is the resistivity in ohm-cm.

| | Composition in percent by weight | | | | | |
|---|---|---|---|---|---|---|
| | 1 | 2 | 3 | 4 | 5 | 6 |
| $SiO_2$ | 62.6 | 65.6 | 64.5 | 64.7 | 63.6 | 65.5 |
| $Li_2O$ | | 0.5 | 0.4 | | | |
| $Na_2O$ | 8.4 | 7.2 | 7.8 | 7.5 | 7.8 | 7.0 |
| $K_2O$ | 7.3 | 7.8 | 6.9 | 8.4 | 8.1 | 8.6 |
| CaO | 2.8 | 4.2 | 4.0 | 2.5 | 3.2 | 2.4 |
| MgO | 2.0 | | | 1.1 | | |
| BaO | 12.7 | 11.5 | 13.1 | 13.7 | 12.4 | 12.4 |
| PbO | | 0.5 | | | 1.2 | 1.7 |
| $Al_2O_3$ | 3.4 | 2.0 | 2.5 | 1.6 | 2.8 | 1.5 |
| $Sb_2O_3$ | 0.6 | 0.1 | 0.6 | 0.4 | 0.4 | 0.4 |
| $As_2O_3$ | | | 0.3 | | 0.2 | 0.2 |
| $CeO_2$ | 0.2 | 0.3 | 0.2 | 0.1 | 0.3 | 0.3 |
| Δ kv | +2.05 | +2.25 | +2.1 | +2.3 | +3.1 | +3.9 |
| U.C. ($\times 10^{+7}$) | 99.0 | 99.3 | 99.7 | 100.0 | 99.0 | 99.0 |
| StP (° C.) | 474 | 459 | 460 | 467 | 645 | 455 |
| AP (° C.) | 501 | 485 | 486 | 494 | 493 | 485 |
| SfP (° C.) | 689 | 680 | 682 | 691 | 694 | 684 |
| WP (° C.) | 1.006 | 1.009 | 1.008 | 1.035 | 1.063 | 1.028 |
| Log $\rho$ 250° C | 9.1 | 10.0 | 9.2 | 9.1 | 9.0 | 9.1 |
| Log $\rho$ 350° C | 7.2 | 7.8 | 7.2 | 7.2 | 7.1 | 7.3 |

What is claimed is:

1. A glass for the envelope of a cathode-ray tube for television display which does not discolor under electron bombardment, has a temperature coefficient of expansion of about $99 \times 10^{-7}$ between 30° and 300° C., an annealing point of at least 485° C., and a softening point at least 195° C. higher, said glass consisting essentially of:

|  | Percent by weight |
|---|---|
| $SiO_2$ | 62–66 |
| $Li_2O$ | 0–1 |
| $Na_2O$ | 7–8.5 |
| $K_2O$ | 6.5–9 |
| CaO | 2–4.5 |
| BaO | 11–14 |
| MgO | 0–3 |
| $Al_2O_3$ | 1–4 |
| $As_2O_3 + Sb_2O_3$ | 0.3–0.7 |
| $CeO_2$ | 0.05–0.3 |
| PbO | 0–3 |

References Cited

UNITED STATES PATENTS

| 2,676,109 | 4/1954 | Barnes et al. | 106—52 |
| 3,222,206 | 12/1965 | Cornelissen et al. | 106—52 X |

FOREIGN PATENTS

| 764,575 | 12/1956 | Great Britain | 106—52 |

OTHER REFERENCES

Weyl, W.A.: Coloured Glasses, London, 1959, p. 23.

Volf, M. B.: Glasses for Television Tubes, in Technical Glasses, London, 1961, pp. 326–327.

L. DEWAYNE RUTLEDGE, Primary Examiner

W. R. SATTERFIELD, Assistant Examiner

U.S. Cl. X.R.

106—53; 313—218

PO-1050
(5/69)

UNITED STATES PATENT OFFICE
CERTIFICATE OF CORRECTION

Patent No. 3,794,502     Dated February 26, 1974

Inventor(s) COENRAAD MARIA LA GROUW

It is certified that error appears in the above-identified patent and that said Letters Patent are hereby corrected as shown below:

In Column 4 of the Patent:

column 5, line 15 of "Composition in percent by weight"

"645" should be --465--

Signed and sealed this 5th day of November 1974.

(SEAL)
Attest:

McCOY M. GIBSON JR.
Attesting Officer

C. MARSHALL DANN
Commissioner of Patents